(12) United States Patent
Simpson et al.

(10) Patent No.: US 10,436,267 B2
(45) Date of Patent: Oct. 8, 2019

(54) NON-WOVEN, FRACTURE REDUCING BRAKE ROTOR PREFORMS AND PADS

(71) Applicant: Advanced Carbon Technologies, LLC, Knoxville, TN (US)

(72) Inventors: Allen Simpson, Buchanan, MI (US); R. Stevan Coursey, Decatur, GA (US)

(73) Assignee: BAM Inc., Knoxville, TN (US)

( * ) Notice: Subject to any disclaimer, the term of this patent is extended or adjusted under 35 U.S.C. 154(b) by 0 days.

(21) Appl. No.: 15/502,461

(22) PCT Filed: Aug. 10, 2015

(86) PCT No.: PCT/US2015/044533
§ 371 (c)(1),
(2) Date: Feb. 7, 2017

(87) PCT Pub. No.: WO2016/023043
PCT Pub. Date: Feb. 11, 2016

(65) Prior Publication Data
US 2017/0234387 A1   Aug. 17, 2017

Related U.S. Application Data

(60) Provisional application No. 62/035,323, filed on Aug. 8, 2014.

(51) Int. Cl.
| F16D 69/00 | (2006.01) |
| F16D 65/12 | (2006.01) |
| F16D 65/02 | (2006.01) |

(52) U.S. Cl.
CPC ........ *F16D 65/125* (2013.01); *F16D 65/126* (2013.01); *F16D 2065/132* (2013.01);
(Continued)

(58) Field of Classification Search
CPC ....... F16D 65/12; F16D 65/125; F16D 65/126
(Continued)

(56) References Cited

U.S. PATENT DOCUMENTS 3,936,552 A * 2/1976 Krupp ................... C04B 35/83
                                                    428/66.2
5,452,738 A    9/1995 Thirion De Briel et al.
(Continued)

FOREIGN PATENT DOCUMENTS

WO    2013/085806 A1    6/2013

OTHER PUBLICATIONS

International Search Report and Written Opinion for PCT/US2015/044533, dated Nov. 2, 2015.

*Primary Examiner* — Christopher P Schwartz

(57) ABSTRACT

The present disclosure describes brake rotor preforms and brake pads configured to reduce fracturing and failure of brake rotors by distributing the axial force applied during braking across butt joints between abutting segments of preforms and rotors manufactured therefrom. The preforms comprise a spiral annular structure formed about a longitudinal axis from a plurality of carbon fiber precursor tow segments having a partial annular shape. Each segment is asymmetrical when viewed in the longitudinal axis direction and configured so planes defined by the segment's ends are never coplanar with planes extending radially from the longitudinal axis. The brake pads have a partial annular shape and ends adapted to prevent planes defined by the ends from being coplanar during use with a plane extending radially from a brake rotor longitudinal axis.

15 Claims, 14 Drawing Sheets

(52) U.S. Cl.
CPC ............... *F16D 2065/1312* (2013.01); *F16D 2200/006* (2013.01); *F16D 2200/0052* (2013.01)

(58) Field of Classification Search
USPC ............................. 188/18 A, 218 A, 218 XL
See application file for complete search history.

(56) References Cited

U.S. PATENT DOCUMENTS

| | | | | |
|---|---|---|---|---|
| 5,452,783 | A * | 9/1995 | Thirion De Briel | F16D 13/64 188/73.2 |
| 5,460,255 | A * | 10/1995 | Quigley | F16D 13/64 188/264 D |
| 5,546,880 | A * | 8/1996 | Ronyak | B29C 70/228 112/420 |
| 5,601,173 | A * | 2/1997 | Thirion de Briel | F16D 13/64 188/73.2 |
| 5,634,535 | A * | 6/1997 | Fennell | F16D 65/126 188/218 XL |
| 6,691,393 | B2 * | 2/2004 | James | C04B 35/83 29/412 |
| 8,281,907 | B2 * | 10/2012 | Fryska | F16D 65/12 188/218 A |
| 2001/0001189 | A1 * | 5/2001 | Johnson | C04B 35/83 188/251 A |
| 2001/0040077 | A1 | 11/2001 | Qian et al. | |
| 2004/0040818 | A1 * | 3/2004 | Young | F16D 13/646 192/107 C |
| 2008/0041675 | A1 * | 2/2008 | Baumgartner | F16D 65/12 188/218 XL |
| 2009/0139807 | A1 | 6/2009 | Fryska et al. | |

\* cited by examiner

NON-WOVEN, FRACTURE REDUCING BRAKE ROTOR PREFORMS AND PADS

FIELD OF THE INVENTION

The present invention relates, generally, to the field of brake friction components, including, but not limited to, brake rotor preforms, brake rotors, brake pads, and methods for manufacturing the same.

BACKGROUND OF THE INVENTION

Brake rotors for some vehicles are manufactured by initially forming brake rotor preforms 10 (also sometimes referred to herein as "preforms") that are subsequently machined to produce the brake rotors. The brake rotor preforms 10 (and, hence, the brake rotors) are formed from a plurality of segments 12 comprising carbon fiber precursor that are laid and abutted end-to-end about a central longitudinal axis 14 to form an annular spiral structure 16. The spiral structure 16 has a plurality of flights 18 (see FIG. 1 in which a single flight 18 is illustrated) similar to those of screw thread, but different from a screw thread in that each successive flight 18 lies longitudinally adjacent to and in contact with a previous flight 18 such that the flights 18 are in contact with one another in the longitudinal direction. Each flight 18 comprises multiple segments 12 with each segment 12 having a partial annular shape such that each segment 12 comprises a sector of an annulus. As more clearly seen in FIGS. 2 and 3, each segment 12 also has an inner radius, $R_I$, an outer radius, $R_O$, an included central angle, $\beta$, about longitudinal axis 14, a first end 20, and a second end 22. Referring back to FIG. 1, the spiral structure 16 also has a plurality of radially-extending butt joints 24, with each butt joint 24 being formed between abutting ends 20, 22 of respectively adjacent segments 12. The central angle, $\beta$, of each segment 12 is generally selected to determine the number of segments 12 per flight 18 of the spiral structure 16 and is selected so that the butt joints 24 between segments 12 of a flight 18 are not coplanar with the butt joints 24 between segments 12 of a longitudinally adjacent flight 18. The segments 12 of a particular flight 18 typically comprise carbon fiber precursor tow oriented in either a chordal direction (see FIG. 2) or in a radial direction (see FIGS. 3 and 4). Generally, the segments 12 of adjacent flights 18 do not include carbon fiber precursor tow oriented in the same direction in order to improve the mechanical and structural properties of the brake rotor preform 10.

The above described preform architecture has been successfully used for brake rotors employed in the aerospace industry where there are, typically, at least two rotors and three stators in a brake stack and axial compression of the stack is used to create and control friction to provide braking. More recently, preforms 10 having such architecture have been used in brake applications having a single carbon-carbon brake rotor disk 30 (also sometimes referred to herein as a "brake rotor 30") machined from a preform 10 to have opposed front and back friction surfaces 32. Braking friction is generated by applying axial force (a force applied in the longitudinal direction of the brake rotor) on only the portions of the brake rotor's friction surfaces 32 which are present between two brake pads 34 (see FIG. 5 in which only one friction surface 32 and one brake pad 34 are visible) held by a caliper. Similar to the segments 12 of the brake rotor preform 10 from which the brake rotor 30 was machined, each brake pad 34 has a partial annular shape with a first end 36 and a second end 38. In such brake applications, the brake pads 34 often do not compress the friction surfaces 32 of the brake rotor 30 uniformly at all times. When compressed with the brake rotor 30 turning between brake pads 34, the compression is sometimes uneven in the axial direction, causing a shear force within the carbon-carbon brake rotor 30. When the butt joints 24 between adjacent segments 12 of the flights 18 of the brake rotor preform 10 (and, hence, of the brake rotor 30) rotate about central longitudinal axis 14 (for example, in the rotational direction 40) past an end 36, 38 of the brake pad 34, the butt joints 24 are radially aligned momentarily at different times in a radially extending plane 42, 44 with either the first end 36 (see FIG. 6) or second end 38 (see FIG. 7) of the brake pad 34 and the shear force causes the carbon-carbon composite of the brake rotor preform 10 (and, hence, of the brake rotor 30) to fracture at or near the butt joints 24 between adjacent segments 12. These fractures then typically propagate through the carbon-carbon composite and cause the entire brake rotor 30 to fail.

There is, therefore, a need in the industry for brake rotor preforms, brake rotors, and/or brake pads having configurations and architectures that solve these and other problems, deficiencies, and shortcomings of the present configurations and architectures.

SUMMARY OF THE INVENTION

Broadly described, the present invention comprises brake friction components that reduce fracturing and failure of brake rotors, together with methods for manufacturing brake friction components. According to example embodiments described herein, such brake friction components include, without limitation, brake rotor preforms, brake rotors machined or otherwise manufactured from brake rotor preforms, and brake pads operable with brake rotors to provide braking. The brake rotor preforms of the example embodiments comprise a spiral annular structure formed about a central longitudinal axis from a plurality of segments having a partial annular shape. Each segment is asymmetrical when viewed in the direction of the central longitudinal axis and is configured such that planes defined, respectively, by each of the segment's ends are not coplanar with planes extending through and radially from the central longitudinal axis. The segments are arranged end-to-end in a series of longitudinally adjacent flights, with a butt joint being formed between ends of abutted segments and with each flight generally including segments of carbon fiber precursor tow oriented in the same direction. Longitudinally adjacent flights may include segments of carbon fiber precursor tow oriented in different directions in order to make the preform's mechanical and structural properties more directionally independent, or may alternatively include segments of carbon fiber precursor tow oriented in a single direction to cause the preform's mechanical and structural properties to be directionally dependent or to add additional strength at the butt joints between abutted segments. The carbon fiber precursor tow may, for example, be oriented in chordal or radial directions, or be oriented at a positive or negative angle relative to the chordal direction. The segments are continuously needled in the longitudinal direction during the preform's manufacture to join the longitudinally adjacent segments of different flights together, thereby improving the preform's mechanical and structural properties and reducing the risk of separation or delamination of the preform's flights from one another.

In accordance with other example embodiments described herein, brake pads are configured with a generally arcuate or partial annular shape about and relative to a longitudinal axis. The brake pads have ends formed such that planes defined, respectively, by each of a pad's ends are not coplanar with planes extending through and radially from a central longitudinal axis of a brake rotor with which the brake pads are used. In one embodiment, the brake pad's ends lie entirely within respective planes that are oriented at angles relative to planes extending through and radially from a central longitudinal axis of a brake rotor. In other embodiments, the brake pad's ends have a wave-like or sawtooth-like shape such that each of the pad's ends do not lie entirely within a single plane.

Advantageously, the brake rotor preforms of the example embodiments reduce fractures and failures at the butt joints between abutted segments by, among other things, preventing a butt joint from aligning coplanarly with an end of a brake pad when axial force is applied during braking by the brake pad to a brake rotor made from a brake rotor preform described herein. When such a brake rotor rotates relative to a conventional brake pad having radially extending ends, a plane defined by an end of the brake pad intersects a plane defined by a butt joint between abutting rotor segments. Initially, at the instant time when the planes begin to intersect, material from only one of the adjacent segments is present on both sides of the plane defined by the brake pad's end. Then, as the brake rotor continues to rotate relative to the brake pad and the planes continue to intersect while an axial force is applied by the brake pad to the brake rotor, material from each abutting segment is present on both sides of the plane defined by the brake pad's end. As the brake rotor rotates further relative to the brake pad, the plane defined by the end of the brake pad no longer intersects with the plane defined by the butt joint between abutting rotor segments, at which time there is again material from only one segment (in this case, from the other segment of the abutting segments) on both sides of the brake pad's end. By virtue of the brake preform's (and, hence, the brake rotor's) configuration, the axial force applied by the brake pad during an encounter of a pad end with a butt joint between abutting segments is distributed incrementally and gradually across the butt joint and to portions of both abutting segments instead of being applied solely to a single segment located on one side of a butt joint as is the case during an encounter between a pad end of a prior art brake pad and a butt joint of a prior art brake rotor manufactured from a prior art brake rotor preform. Because the axial force is not applied solely to a single segment during such encounter, there is less tendency for the abutting segments to shear relative to one another and, consequently, for a fracture to develop at the butt joint that may result in failure of the entire brake rotor.

Also advantageously, the brake pads of the example embodiments reduce fractures and failures at butt joints between adjacent segments of conventional brake rotors manufactured from conventional brake preforms. In a manner similar to that of the brake rotor preforms of the example embodiments, the brake pads (instead of the brake rotor preform and brake rotor) are configured to prevent a butt joint of a conventional brake rotor from aligning coplanarly with an end of the brake pad when axial force is applied during braking by the brake pad to the brake rotor. Due to such configuration and as similarly described above, the axial force applied by the brake pad during an encounter of a pad end with a butt joint between abutting segments is distributed across the butt joint and to portions of both abutting segments instead of being applied solely to a single segment located on one side of a butt joint as is the case during an encounter between a pad end of a prior art brake pad and a butt joint of a prior art brake rotor manufactured from a prior art brake rotor preform. By virtue of the axial force being applied to segments on both sides of the butt joint during such encounter, the abutting segments are less prone to shear relative to one another and, hence, there is a reduced possibility of a fracture developing at the butt joint that may, ultimately, cause the entire brake rotor to fail.

Other uses, advantages and benefits of the present invention may become apparent upon reading and understanding the present specification when taken in conjunction with the appended drawings.

DETAILED DESCRIPTION OF THE DRAWINGS

Figure 1:
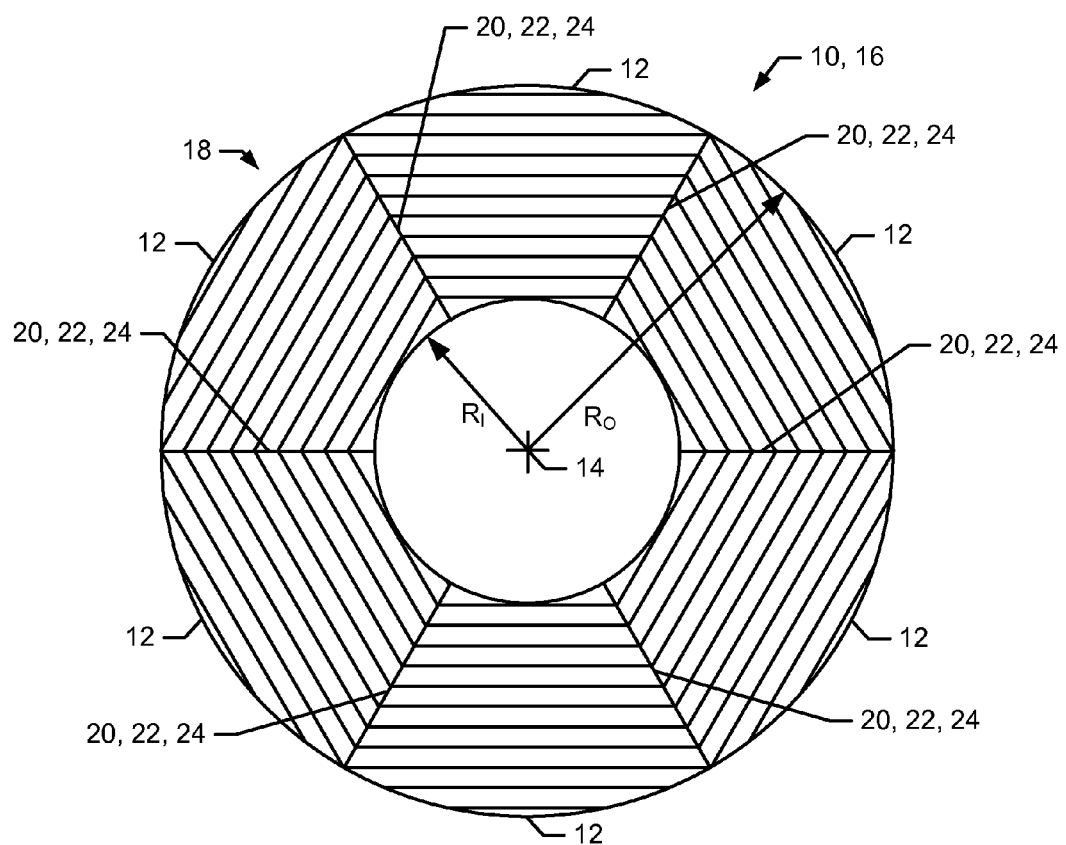
FIG. 1 displays a schematic, longitudinal view of a first flight of a brake rotor preform, in accordance with prior art, having carbon fiber precursor tow oriented in a chordal direction.
Figure 2:
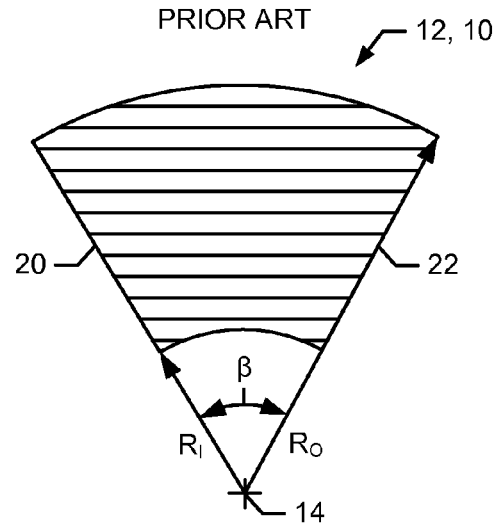
FIG. 2 displays a schematic, longitudinal view of an individual segment of the flight of FIG. 1.
Figure 4:
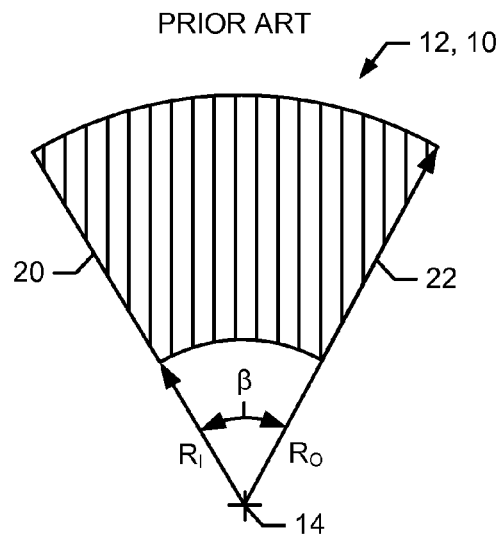
FIG. 4 displays a schematic, longitudinal view of an individual segment of the flight of FIG. 3.
Figure 3:
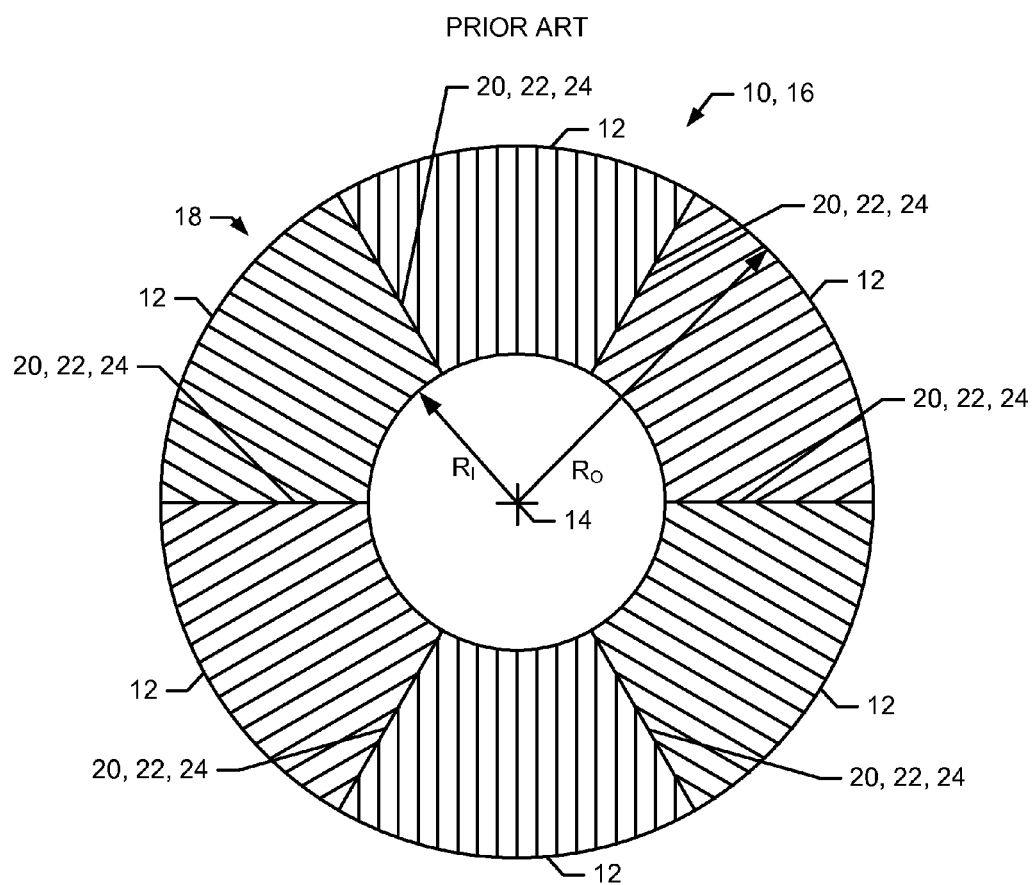
FIG. 3 displays a schematic, longitudinal view of a second flight of the brake rotor perform of FIG. 1 having carbon fiber precursor tow oriented in a radial direction.
Figure 5:
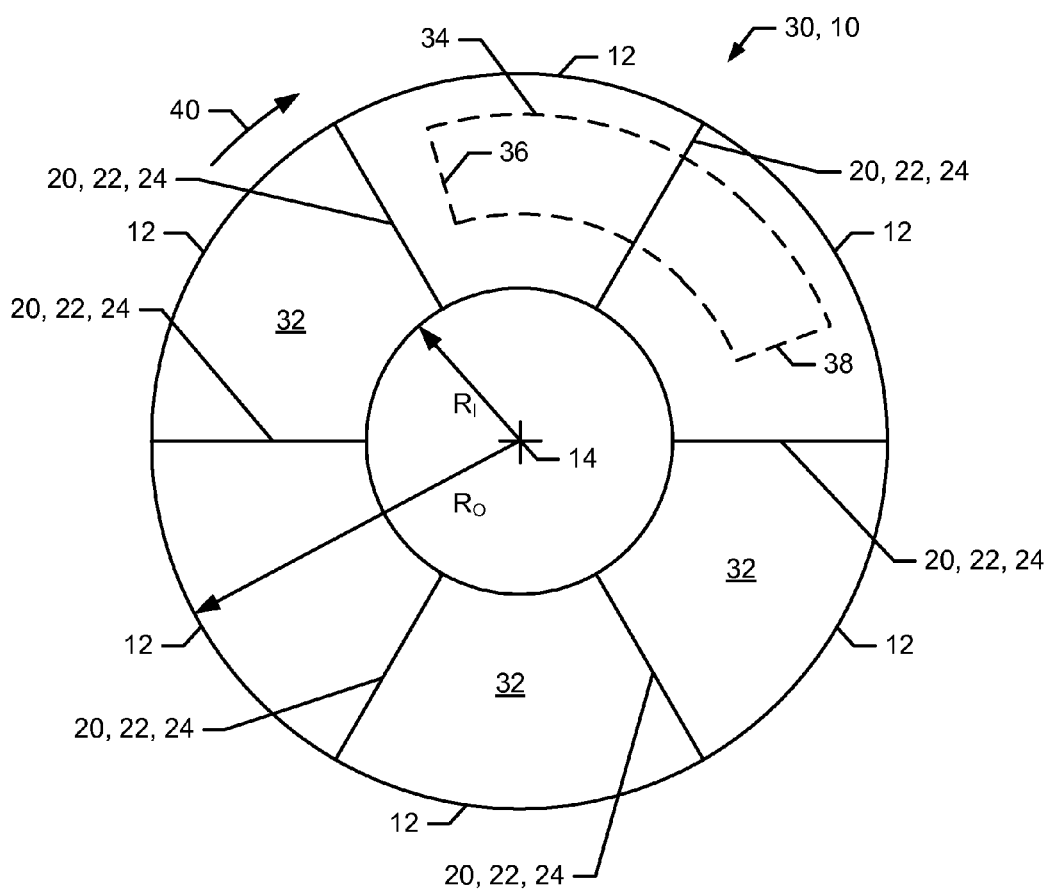
FIG. 5 displays a schematic, longitudinal view of a brake rotor machined from a brake rotor preform including the flights of FIG. 1 and FIG. 2, and showing a brake pad relative thereto.
Figure 6:
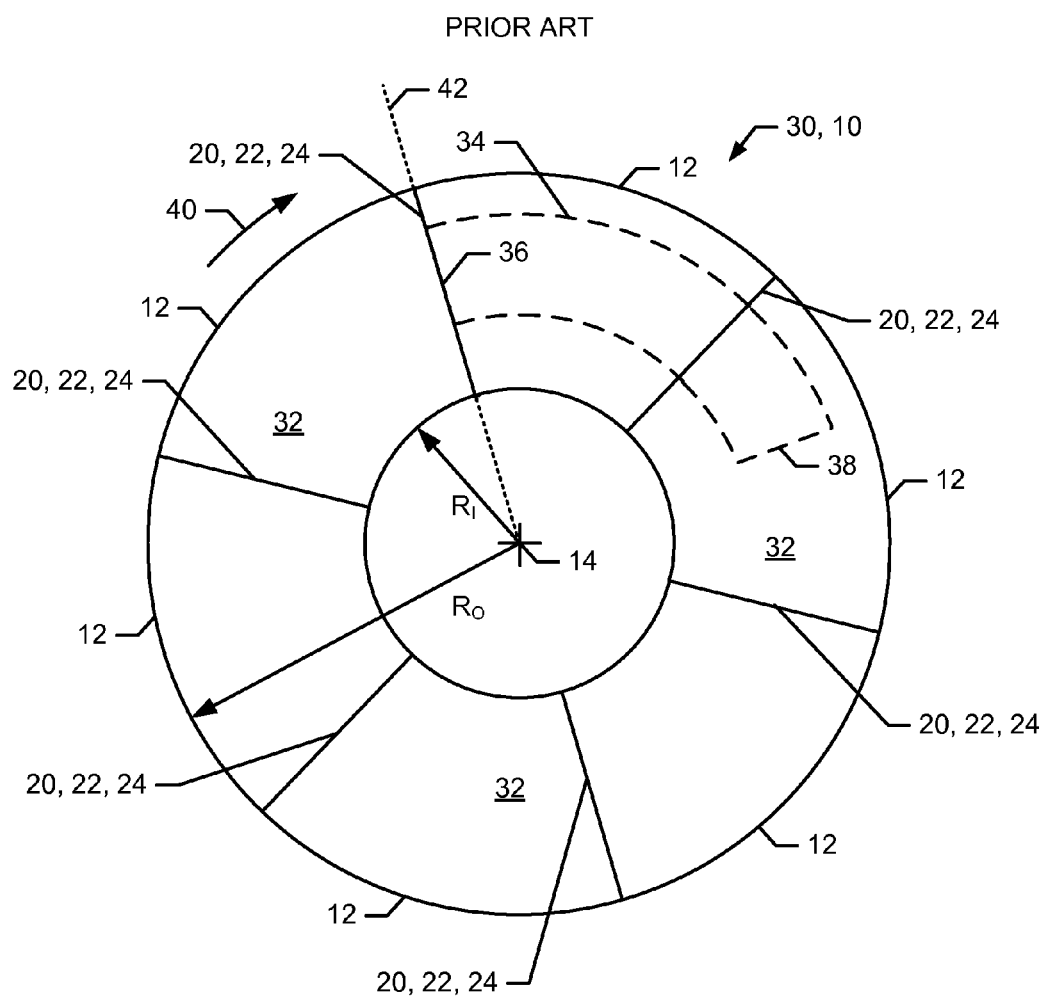
FIG. 6 displays a schematic, longitudinal view of the brake rotor of FIG. 5 in a first orientation relative to the brake pad at a first time during rotation of the brake rotor relative to the brake pad.
Figure 7:
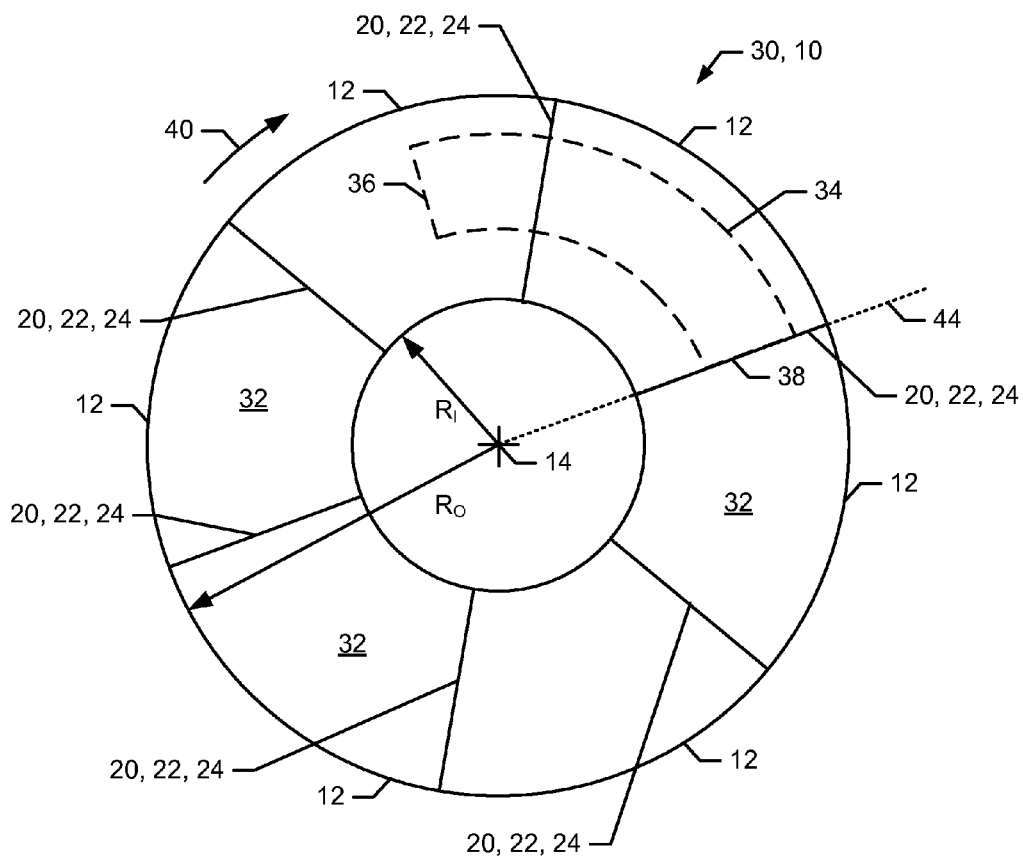
FIG. 7 displays a schematic, longitudinal view of the brake rotor of FIG. 6 in a second orientation relative to the brake pad at a second time during rotation of the brake rotor relative to the brake pad.
Figure 8:
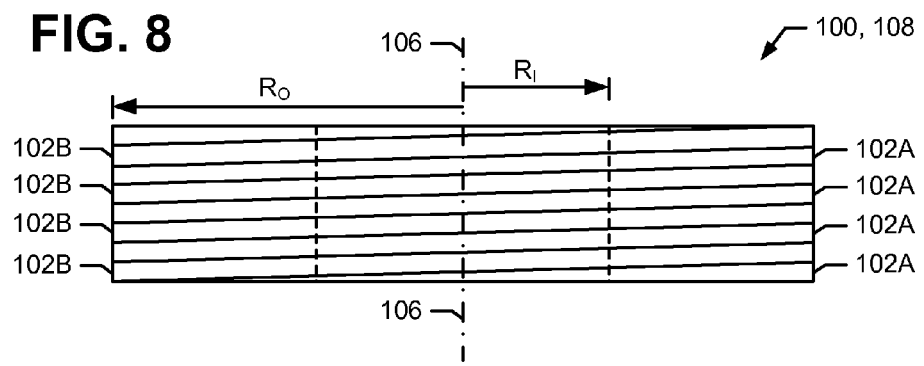
FIG. 8 displays a schematic, side elevational view of a brake rotor preform, in accordance with a first example embodiment, having an annular spiral architecture and including a plurality of flights of partial annular segments.

Referring now to the drawings in which like numerals represent like elements or steps throughout the several views, FIG. 8 displays a schematic, side elevational view of a brake rotor preform 100 having a new architecture in accordance with a first example embodiment of the present invention. The brake rotor preform 100 comprises a plurality of flights 102 (see FIGS. 9 and 11) of multiple segments 104 (see FIGS. 10 and 12) arranged about a longitudinal central axis 106 in an annular spiral structure 108 having an inner radius, $R_I$, and an outer radius, $R_O$, relative to the longitudinal central axis 106. The flights 102 of the annular spiral structure 108 are similar to those of screw thread, but different from a screw thread in that each successive flight 102 lies longitudinally adjacent to and in contact with a previous flight 102 such that the flights 102 are in contact with one another in the longitudinal direction. The flights 102 of the annular spiral structure 108 include a plurality of first flights 102A having carbon fiber precursor tow oriented in a chordal direction and a plurality of second flights 102B having carbon fiber precursor tow oriented in a radial direction. The first flights 102A and second flights 102B are generally arranged in an alternating configuration such that a second flight 102B is longitudinally present between two successive first flights 102A. Through use of this alternating configuration instead of a configuration having all carbon fiber precursor tow oriented in a single direction or a configuration having longitudinally adjacent flights with the same carbon fiber tow orientation grouped together, the mechanical and structural properties of the preform 100 are improved and made more uniform and symmetrical in all directions. It should, however, be appreciated and understood that in other example embodiments (including other example embodiments described herein), the preform 100 may include flights 102 having carbon fiber precursor tow oriented in directions other than the chordal and radial directions, may include flights 102 having carbon fiber precursor oriented in a lesser or greater number of directions, and may include flights 102 arranged in a configuration other than an alternating configuration.

Figure 9:
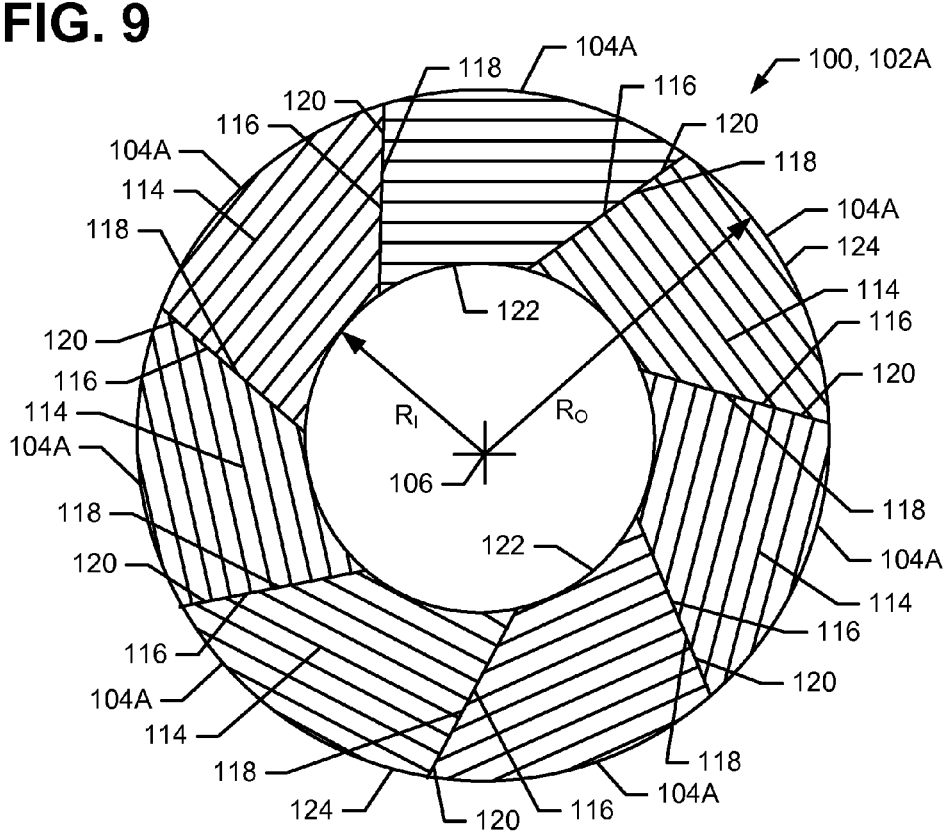
FIG. 9 displays a schematic, longitudinal view of a first flight of the brake rotor preform of FIG. 8 having carbon fiber precursor tow oriented in a chordal direction.

FIG. 9 displays a schematic, longitudinal view of a first flight 102A of brake rotor preform 100 in accordance with the first example embodiment of the present invention. The first flight 102A comprises a plurality of segments 104A manufactured from carbon fiber precursor tow 114 oriented in a chordal direction. Each segment 104A comprises a sector of an annulus and has a first end 116 and a second end 118. The segments 104A are laid end-to-end about the longitudinal central axis 106 and form butt joints 120 at the abutting ends 116, 118 of two adjacent segments 104A. However, unlike prior art preforms, the butt joints 120 and ends 116, 118 are not aligned with a radius of the preform 100 and do not extend in a radial direction.

Figure 10:
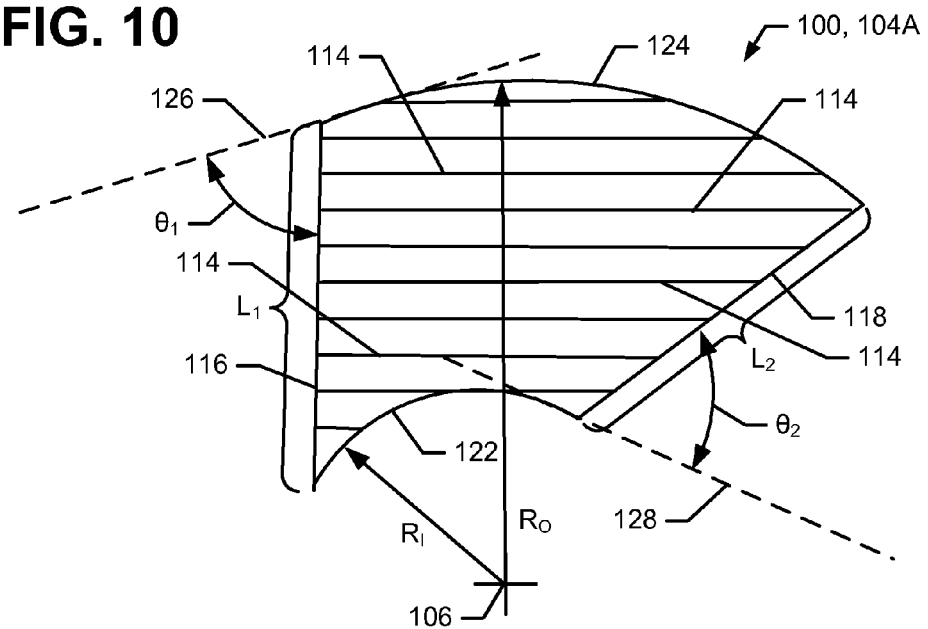
FIG. 10 displays a schematic, longitudinal view of an individual segment of the flight of FIG. 9.

An individual segment 104A of the first flight 102A brake rotor preform 100, according to the first example embodiment of the present invention, is illustrated in the schematic, longitudinal view of FIG. 10. The segment 104A comprises, as described above, carbon fiber precursor tow 114 oriented in a chordal direction and has an asymmetric shape when viewed in a longitudinal direction. As illustrated in FIG. 10, the segment 104A has an inner edge 122 formed at the preform's inner radius, $R_I$, and an outer edge 124 formed at the preform's outer radius, $R_O$, that is radially disposed relative to the inner edge 122. The segment's first and second ends 116, 118 extend between the segment's inner and outer edges 122, 124 that have respective lengths, $L_1$ and $L_2$, between the segment's inner and outer edges 122, 124. The segment's first end 116 defines an angle, $\theta_1$, relative to a tangent 126 of the segment's outer edge 124 at the location where the segment's outer edge 124 and first end 116 intersect. The segment's second end 118 defines an angle, $\theta_2$, relative to a tangent 128 of the segment's inner edge 122 at the location where the segment's inner edge 122 and second end 118 intersect. According to the first example embodiment, the angular measures of angles $\theta_1$ and $\theta_2$ are equal and the lengths $L_1$ and $L_2$ of first and second ends 116, 118 are also equal. The particular angular measures for angles $\theta_1$ and $\theta_2$ and the particular lengths $L_1$ and $L_2$ of first and second ends 116, 118 depend on the particular embodiment of the preform 100 and its dimensions in such embodiment.

Figure 11:
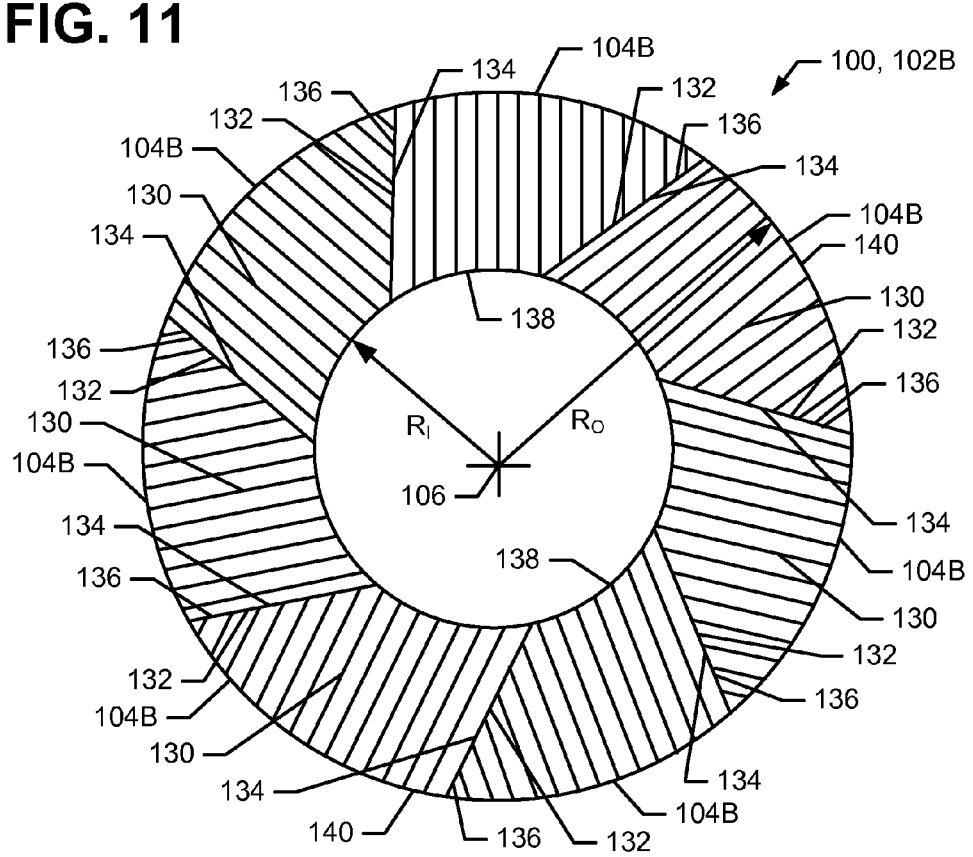
FIG. 11 displays a schematic, longitudinal view of a second flight of the brake rotor preform of FIG. 8 having carbon fiber precursor tow oriented in a radial direction.

FIG. 11 displays a schematic, longitudinal view of a second flight 102B of brake rotor preform 100 in accordance with the first example embodiment of the present invention. The second flight 102B comprises a plurality of segments 104B manufactured from carbon fiber precursor tow 130 oriented in a radial direction. Each segment 104B comprises a sector of an annulus and has a first end 132 and a second end 134. The segments 104B are laid end-to-end about the longitudinal central axis 106 and form butt joints 136 at the abutting ends 132, 134 of two adjacent segments 104B. However, similar to the segments 104A of the first flight 102A and unlike prior art preforms, the butt joints 136 and ends 132, 134 are not aligned with a radius of the preform 100 and do not extend in a radial direction.

Figure 12:
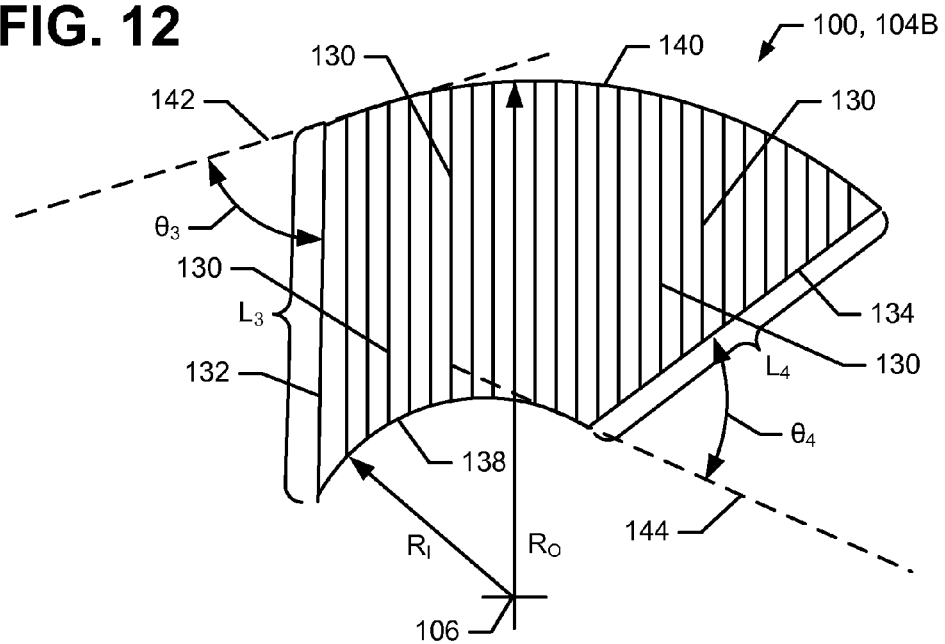
FIG. 12 displays a schematic, longitudinal view of an individual segment of the flight of FIG. 11.

An individual segment 104B of the second flight 102B brake rotor preform 100, according to the first example embodiment of the present invention, is illustrated in the schematic, longitudinal view of FIG. 12. The segment 104B comprises, as described above, carbon fiber precursor tow 130 oriented in a radial direction and has an asymmetric shape when viewed in a longitudinal direction. As illustrated in FIG. 12, the segment 104B has an inner edge 138 formed at the preform's inner radius, $R_I$, and an outer edge 140 formed at the preform's outer radius, $R_O$, that is radially disposed relative to the inner edge 138. The segment's first and second ends 132, 134 extend between the segment's inner and outer edges 138, 140 that have respective lengths, $L_3$ and $L_4$, between the segment's inner and outer edges 138, 140. The segment's first end 132 defines an angle, $\theta_3$, relative to a tangent 142 of the segment's outer edge 140 at the location where the segment's outer edge 140 and first end 132 intersect. The segment's second end 134 defines an angle, $\theta_4$, relative to a tangent 144 of the segment's inner edge 138 at the location where the segment's inner edge 138 and second end 134 intersect. According to the first example embodiment, the angular measures of angles $\theta_3$ and $\theta_4$ are equal and the lengths $L_3$ and $L_4$ of first and second ends 132, 134 are also equal. The particular angular measures for angles $\theta_3$ and $\theta_4$ and the particular lengths $L_3$ and $L_4$ of first and second ends 132, 134 depend on the particular embodiment of the preform 100 and its dimensions in such embodiment. Also according to the first example embodiment, the angular measures of angles $\theta_3$ and $\theta_4$ are equal to the angular measures of angles $\theta_1$ and $\theta_2$ of segments 104A and the lengths $L_3$ and $L_4$ of first and second ends 132, 134 are equal to the lengths $L_1$ and $L_2$ of the first and second ends 116, 118 of segments 104A.

The preform 100 of the first example embodiment is, typically, manufactured through use of machine which places segments 104A about longitudinal axis 106 in an end-to-end manner to form a first flight 102A of the preform's annular spiral structure 108. Once the first flight 102A is complete, segments 104B are placed about longitudinal axis 106 in an end-to-end manner to form a second flight 102B of the preform's annular spiral structure 108. The placement of segments 104A, 104B about longitudinal axis 106 is repeated to form additional first and second flights 102A, 102B of the preform's annular spiral structure 108 such that second flights 102B are alternatingly included between successive first flights 102A. As segments 104A, 104B are positioned and flights 102A, 102B are formed, the segments 104A, 104B and carbon fiber precursor tow 114, 130 thereof are needled together to couple the segments 104A, 104B and flights 102A, 102B together in the preform's longitudinal direction to create the preform's annular spiral structure 108. After the segments 104A, 104B and flights 102A, 102B have been respectively formed and needled together, the preform 100 is carbonized to change the carbon fiber precursor into carbon fiber and then a carbon matrix is subsequently added to the preform 100. Finally, the preform 100 is machined to produce a brake rotor 150 having the underlying annular spiral structure 108 of the preform 100. Generally, such machining produces a brake rotor 150 having at least one friction surface 152.

Figure 13:
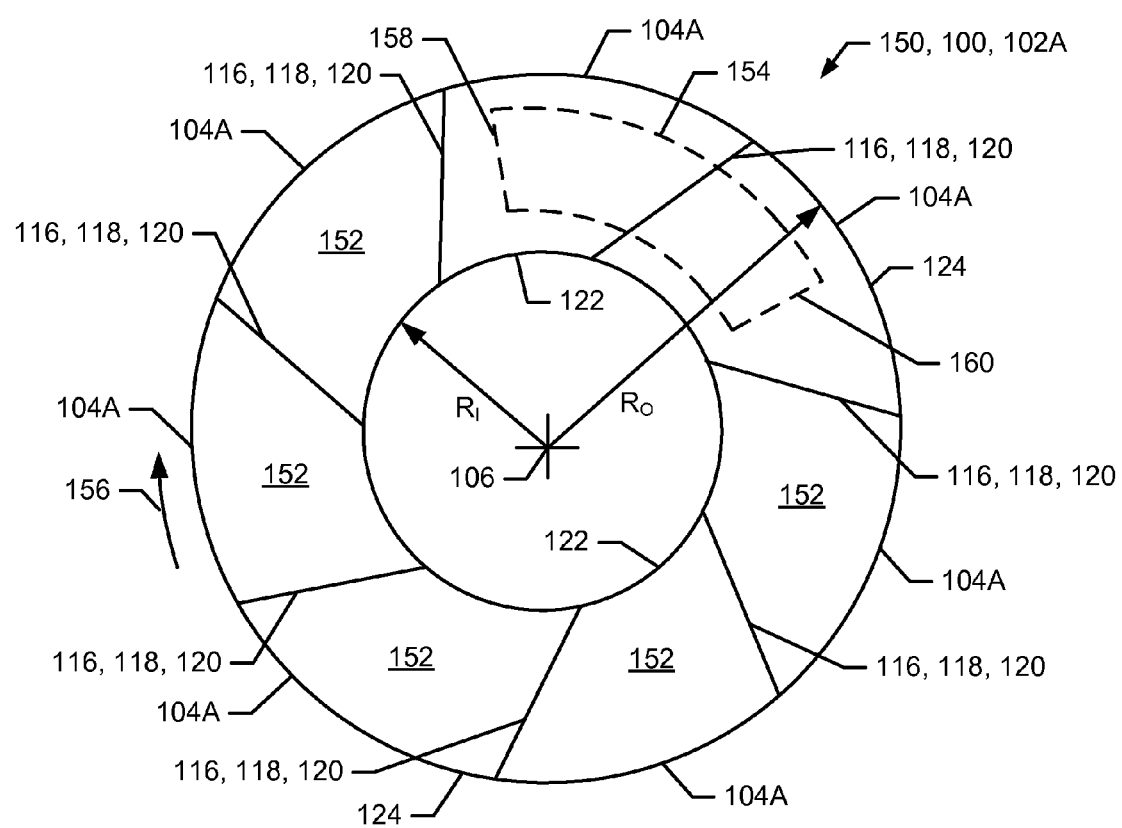
FIG. 13 displays a schematic representation of a brake rotor based on the brake preform of FIGS. 8-12 and a brake pad during braking.

In use on a vehicle, the brake rotor 150 rotates in tandem with a wheel of the vehicle with vehicle braking being accomplished by the application of an axial force causing a brake pad 154 held by a caliper to engage the brake rotor's friction surface 152. FIG. 13 displays a schematic representation of the relationship between the brake rotor 150 (and the butt joints 120, 136 of the brake rotor 150 and underlying preform 100) and brake pad 154 during rotation of the brake rotor 150 about longitudinal axis 106 in rotational direction 156. In FIG. 13, only segments 104A of a first flight 102A of the brake rotor 150 and underlying preform 100 are shown in relation to the brake pad 154, but it should be appreciated and understood that a similar relationship exists between segments 104B of a second flight 102B of the brake rotor 150, underlying preform 100, and brake pad 154.

Figure 14:
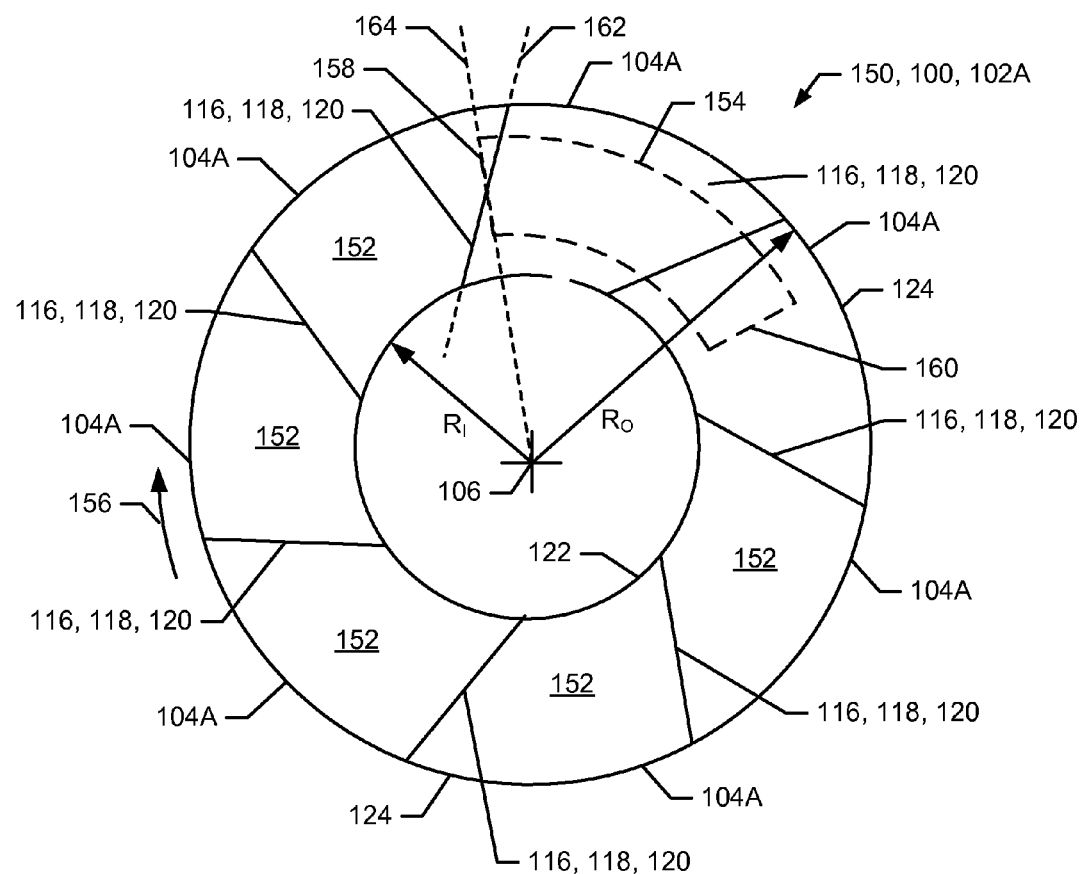
FIG. 14 displays a schematic representation of the brake rotor and brake pad of FIG. 13, illustrating the non-coplanar alignment of a brake rotor butt joint and a first end of the brake pad during braking.
Figure 15:
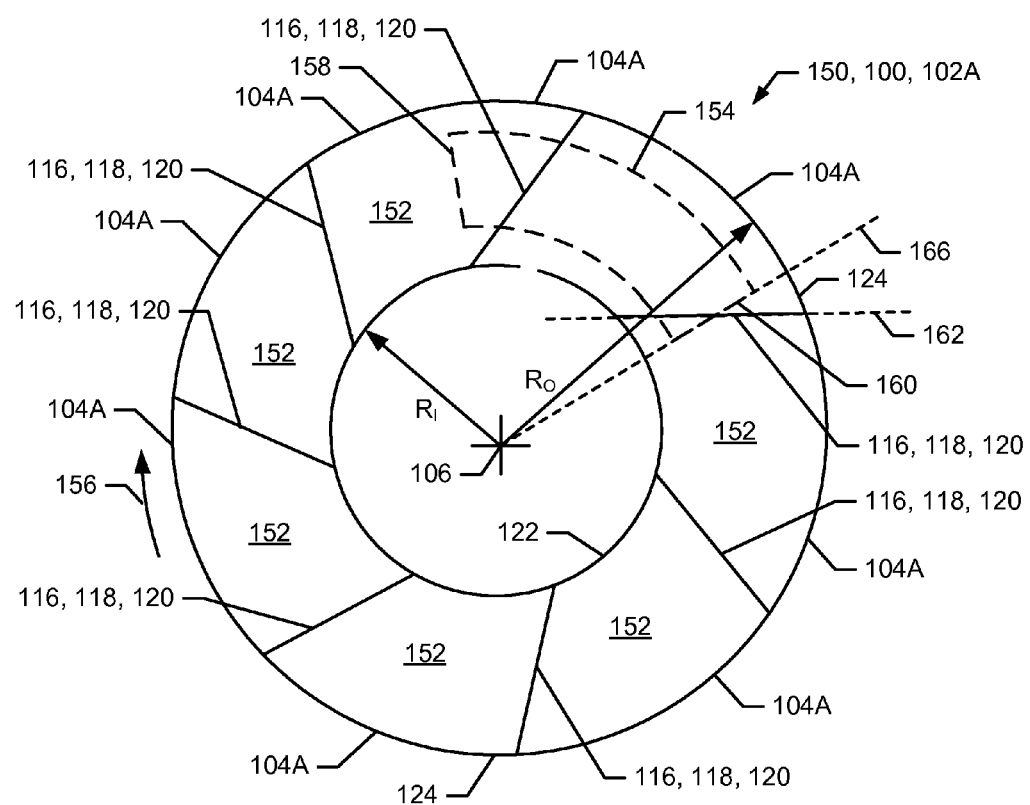
FIG. 15 displays a schematic representation of the brake rotor and brake pad of FIG. 13, illustrating the non-coplanar alignment of a brake rotor butt joint and a second end of the brake pad during braking.

As the brake rotor 150 rotates during vehicle braking, the brake rotor 150 rotates in the rotational direction 156 with the butt joints 120 of the brake rotor 150 (and underlying brake rotor preform 100) passing under the first and second ends 158, 160 of the brake pad 154. However, unlike prior art brake rotors and preforms, the butt joints 120 are never radially aligned with either the first end 158 or second end 160 of the brake pad 154. More particularly and as seen in FIGS. 14 and 15, planes 162 defined by the butt joints 120 are never coplanar during braking with planes 164, 166 defined, respectively, by the first and second ends 158, 160 of the brake pad 154 and central longitudinal axis 106. To clarify, planes 164, 166 extend radially from central longitudinal axis 106 with central longitudinal axis 106 lying within each plane 164, 166. Furthermore and also during vehicle braking, planes 162 associated, respectively, with each butt joint 120 intersect planes 164, 166 corresponding to the brake pad's first and second ends 158, 160 at only a single location as the butt joints 120 pass under the brake pad's first and second ends 164, 166. As a consequence, axial forces exerted on the brake rotor 150 by the brake pad 154 are never applied entirely at the butt joints 120 and are, instead, distributed across the butt joints 120 between two abutting segments 104A with the result being reduced fracturing and failure of the brake rotor 150 and underlying brake rotor preform 100.

Figure 16:
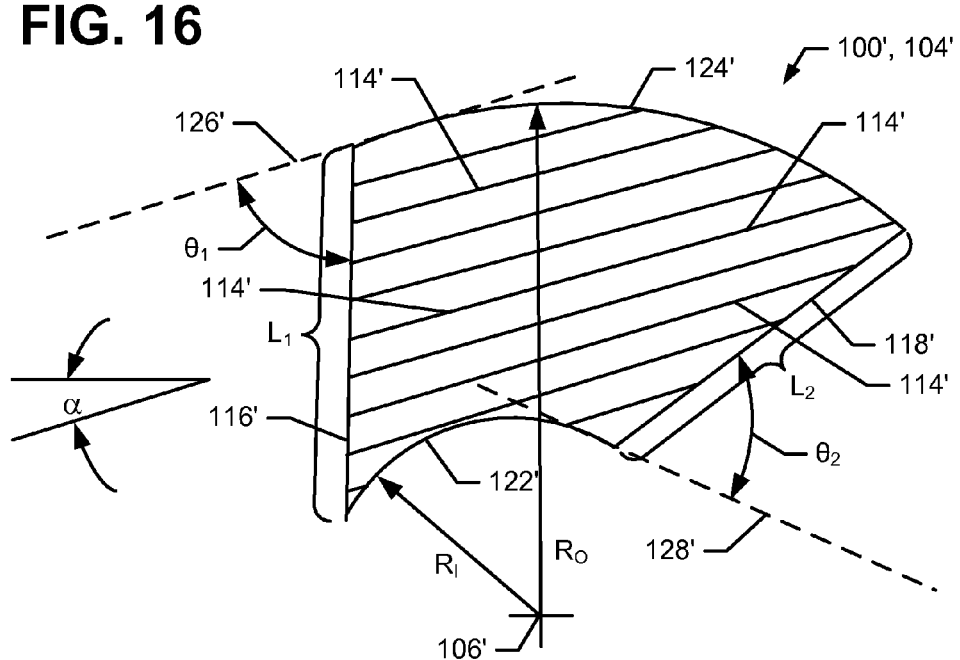
FIG. 16 displays a schematic, longitudinal view of an individual segment of a flight of a brake rotor preform, in accordance with a second example embodiment of the present invention, having carbon fiber precursor tow oriented at a positive angle relative to the segment's chordal direction.

FIG. 16 displays a schematic, longitudinal view of an individual segment 104' of a flight 102' of a brake rotor preform 100' in accordance with a second example embodiment of the present invention. The segment 104' comprises one segment 104' of a plurality of segments 104' forming the flight 102', which are both, respectively, substantially similar to the segments 104 and flights 102 of the preform 100 of the first example embodiment of the present invention with the exception that segment 104' comprises carbon fiber precursor tow 114' oriented an angle, $\alpha$, relative to the chordal direction of the segment 104'. According to the second example embodiment, the angle, $\alpha$, has an angular measure of approximately twenty-five degrees (25°). However, it should be appreciated and understood that in other embodiments, the angle, $\alpha$, may have a different angular measure, including, but not limited to, angular measures in a range between five degrees (5°) and thirty-five degrees (35°).

Figure 17:
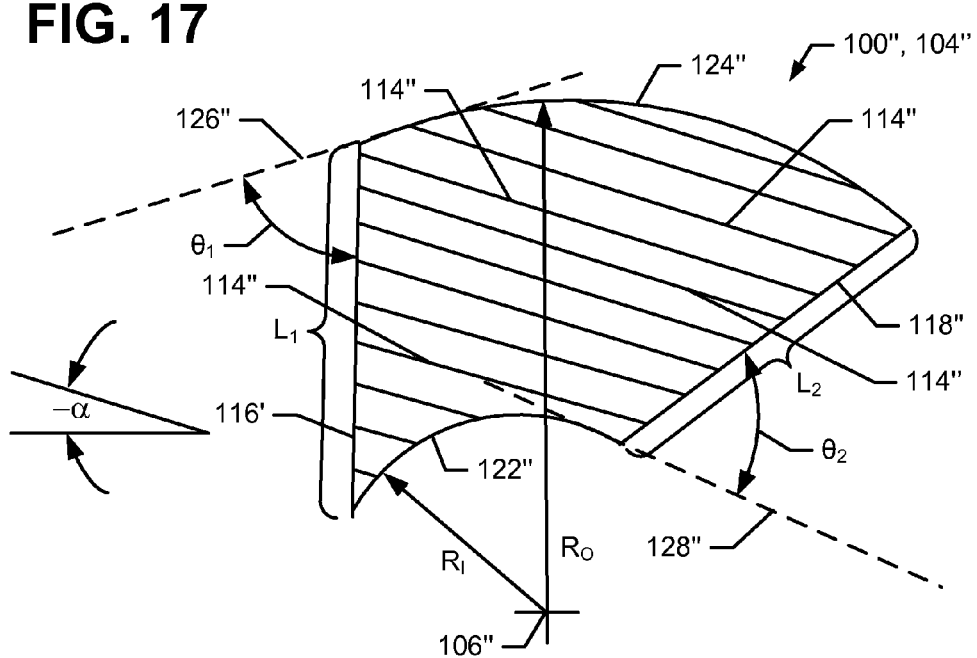
FIG. 17 displays a schematic, longitudinal view of an individual segment of a flight of a brake rotor preform, in accordance with a third example embodiment of the present invention, having carbon fiber tow oriented at a negative angle relative to the segment's chordal direction.

FIG. 17 displays a schematic, longitudinal view of an individual segment 104" of a flight 102" of a brake rotor preform 100" in accordance with a third example embodiment of the present invention. The segment 104" and flight 102" of the third example embodiment are substantially similar to the segment 104 and flights 102 of the first example embodiment, except that segment 104" comprises carbon fiber precursor tow 114" oriented at a negative angle, $-\alpha$, relative to the chordal direction of the segment 104". According to the third example embodiment, the negative angle, $-\alpha$, has an angular measure of approximately minus twenty-five degrees (−25°). However, it should be appreciated and understood that in other embodiments, the negative angle, $-\alpha$, may have a different angular measure, including, but not limited to, angular measures in a range between minus five degrees (−5°) and minus thirty-five degrees (−35°).

Figure 18:
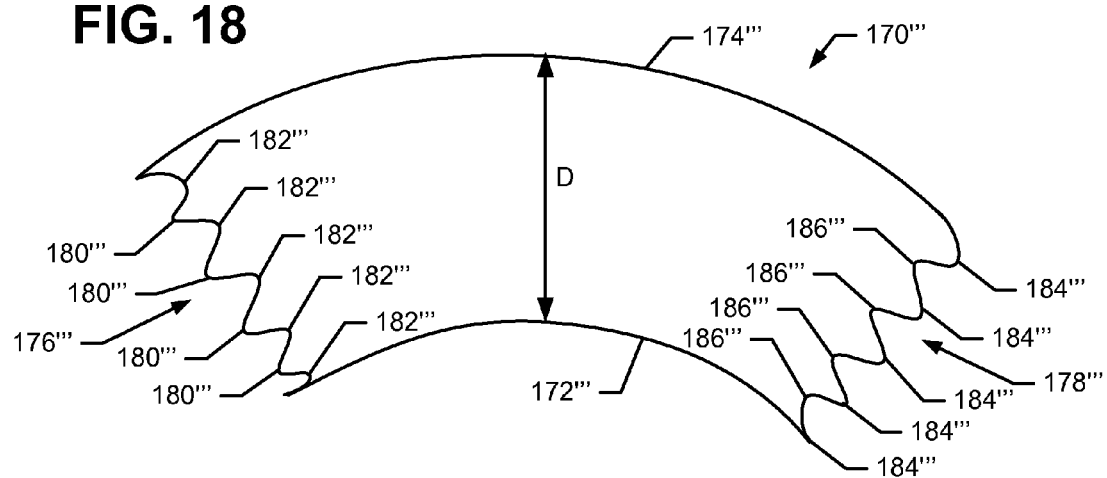
FIG. 18 displays a schematic, longitudinal view of a brake pad, in accordance with a fourth example embodiment of the present invention, having ends with wave-like shapes.

While the brake rotor preforms 100, 100', 100" of the example embodiments described above reduce fracturing and failure of brake rotors made therefrom, a reduction in fracturing and failure of brake rotors may also be obtained by brake pads that apply an axial force to a brake rotor 30 manufactured from a prior art brake preform 10 across the radially-extending butt joints 24 between segments 12 thereof. FIG. 18 displays a schematic, longitudinal view of a brake pad 170''' configured in accordance with a fourth example embodiment of the present invention. The brake pad 170''' has an arcuate inner edge 172''' and an arcuate outer edge 174''' disposed at a distance, D, relative to the arcuate inner edge 172''' such that the brake pad 170''' forms a sector of an annulus. The brake pad 170''' has first and second ends 176''', 178''' formed between the pad's arcuate inner and outer edges 172''', 174'''. The pad's first end 176''' has a wave-like shape with a series of crests 180''' and troughs 182'''. The pad's second end 178''' also has a wave-like shape having a series of crests 184''' and troughs 186'''. By virtue of the presence of the pad's crests 180''', 184''' and troughs 182''', 186''', the first and second ends 176''' and 178''' of the brake pad 170''' are never coplanar with a plane of a radially-extending butt joint 24 during use. Consequently, the axial force applied by the brake pad 170''' to a brake rotor 30 is distributed across the plane of a radially-extending butt joint 24 to multiple segments 12, thereby reducing fracturing and failure of the brake rotor 30.

Figure 19:
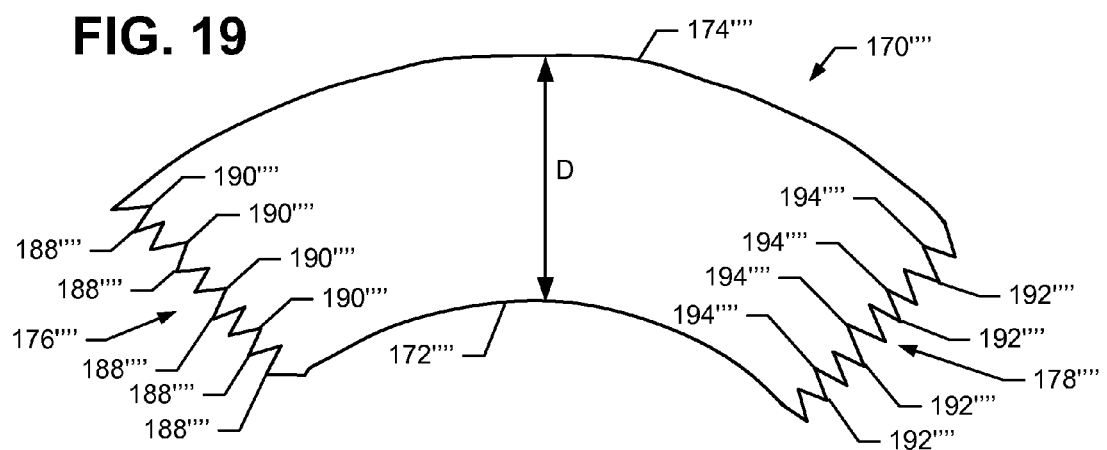
FIG. 19 displays a schematic, longitudinal view of a brake pad, in accordance with a fifth example embodiment of the present invention, having ends with sawtooth-like shapes.

FIG. 19 displays a schematic, longitudinal view of a brake pad 170'''' configured in accordance with a fifth example embodiment of the present invention that is substantially similar to the brake pad 170''' of the fourth example embodiment. However, instead of crests 180''', 184''' and troughs 182''', 186', the brake pad 170'''' has a first end 176'''' having a sawtooth-like shape with a series of teeth 188'''' and gullets 190''''. The brake pad 170'''' has a second end 178'''' similarly having a sawtooth-like shape with a series of teeth 192'''' and gullets 194''''. Similar to the brake pad 170''' of the fourth example embodiment, the first and second ends 176'''' and 178'''' of brake pad 170'''' are never coplanar with a plane of a radially-extending butt joint 24 during use. As a result, the axial force applied by the brake pad 170'''' to a brake rotor 30 is distributed across the plane of a radially-extending butt joint 24 to multiple segments 12, thereby reducing fracturing and failure of the brake rotor 30.

Figure 20:
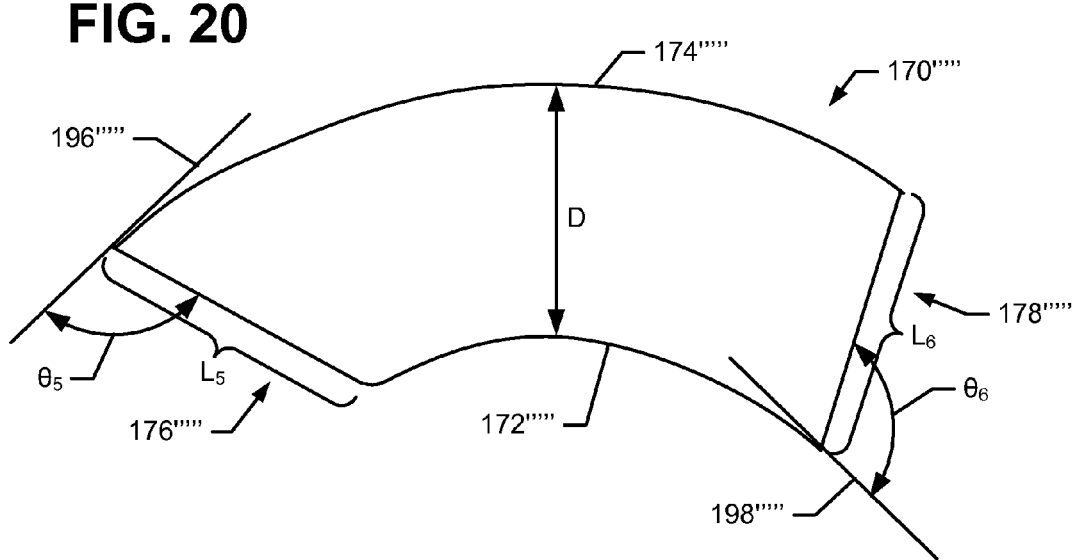
FIG. 20 displays a schematic, longitudinal view of a brake pad, in accordance with a sixth example embodiment of the present invention, having a shape similar to that of the segments of FIGS. 10 and 12.

FIG. 20 displays a schematic, longitudinal view of a brake pad 170''''' in accordance with a sixth example embodiment of the present invention. Similar to the brake pads 170''', 170'''' of the fourth and fifth example embodiments, the brake pad 170''''' has an arcuate inner edge 172''''' and an arcuate outer edge 174''''' disposed at a distance, D, relative to the arcuate inner edge 172'''''. Also similarly and as illustrated in FIG. 20, the brake pad 170''''' has first and second ends 176''''', 178''''' formed between the pad's arcuate inner and outer edges 172''''', 174'''''. However, different from the brake pads 170''', 170'''' of the fourth and fifth example embodiments, the first and second ends 176''''', 178''''' of the brake pad 170''''' of the sixth example embodiment extend linearly between the pad's arcuate inner and outer edges 172''''', 174'''''. The first and second ends 176''''', 178''''' have respective lengths, $L_5$ and $L_6$, between the pad's inner and outer edges 172''''', 174'''''. The pad's first end 176''''' defines an angle, $\theta_5$, relative to a tangent 196''''' of the pad's outer edge 174''''' at the location where the pad's outer edge 174''''' and first end 176''''' intersect. The pad's second end 178''''' defines an angle, $\theta_6$, relative to a tangent 198''''' of the pad's inner edge 172''''' at the location where the pad's inner edge 172''''' and second end 178''''' intersect. According to the sixth example embodiment, the angular measures of angles $\theta_5$ and $\theta_6$ are equal and the lengths $L_5$ and $L_6$ of first and second ends 176''''', 178''''' are also equal.

The brake pad 170''''' of the sixth example embodiment is substantially similar in shape to the partial annular segments 104 of the first example embodiment. As a consequence, when used with a prior art brake rotor 30, the pad's ends 176''''', 178''''' are never coplanar with the brake rotor's butt joints 24 during braking. Therefore, the brake pad 170' reduces fracturing and failure of the brake rotor 30.

It should be appreciated and understood that brake rotor preforms 100 may, in other example embodiments, each include segments 104 having a single shape, a single orientation of carbon fiber precursor tow, multiple shapes, multiple orientations of carbon fiber precursor tow, or a combination of multiple shapes and multiple orientations of carbon fiber precursor tow. For example and not limitation, a brake rotor preform 100 may include segments 104 forming fifty percent (50%) of the preform's segments, segments 104' forming twenty-five percent (25%) of the preform's segments, and segments 104" forming twenty-five (25%) of the preform's segments. Segments 104', 104" may include respective angles, θ, having angular measures in a range of plus/minus five degrees (+/−5°) to plus/minus thirty-five degrees (+/−35°). It should be further appreciated and understood that brake pads may, in other example embodiments, have ends with shapes other than those described herein or have ends with a combination of shapes.

Whereas the present invention has been described in detail above with respect to example embodiments thereof, it should be appreciated that variations and modifications might be effected within the spirit and scope of the present invention.

What is claimed is:

1. A brake rotor preform from which a vehicle brake rotor is manufactured, comprising:
a plurality of segments of carbon fiber precursor configured end-to-end in a helical structure having a central longitudinal axis, wherein each segment of said plurality of segments has an outer edge at a first radius relative to said central longitudinal axis and an inner edge at a second radius relative to said central longitudinal axis, wherein each segment of said plurality of segments has a first end extending between said inner and outer edges and defining a single first plane, wherein each segment of said plurality of segments has a second end extending between said inner and outer edges and defining a single second plane, and wherein neither of said first plane nor said second plane are coplanar with any plane extending radially from and including said central longitudinal axis.

2. The brake rotor preform of claim 1, wherein said first plane intersects with a plane extending radially from and including said central longitudinal axis only along a line extending parallel to said central longitudinal axis, and wherein said second plane intersects with a plane extending radially from and including said central longitudinal axis only along a line extending parallel to said central longitudinal axis.

3. The brake rotor preform of claim 1, wherein said first end has a length and said second end has a length, and wherein said length of said first end has a measure equal to the measure of said length of said second end.

4. The brake rotor preform of claim 3, wherein said first plane defines a first angle relative to a plane tangent to said outer edge at the intersection of said outer edge and said first end, wherein said second plane defines a second angle relative to a plane tangent to said inner edge at the intersection of said outer edge and said second end, and wherein said first angle has a measure equal to the measure of said second angle.

5. The brake rotor preform of claim 1, wherein a segment of said plurality of segments comprises carbon fiber precursor tow oriented in a chordal direction of said segment.

6. The brake rotor preform of claim 1, wherein a segment of said plurality of segments comprises carbon fiber precursor tow oriented in a radial direction of said segment.

7. The brake rotor preform of claim 1, wherein a segment of said plurality of segments comprises carbon fiber precursor tow oriented in a direction defining an angle relative to a chordal direction of said segment, and wherein said angle has an angular measure between five degrees and thirty-five degrees.

8. The brake rotor preform of claim 1, wherein a segment of said plurality of segments comprises carbon fiber precursor tow oriented in a direction defining defining an angle relative to a chordal direction of said segment, and wherein said angle has a positive or negative angular measure.

9. A brake rotor preform from which a vehicle brake rotor is manufactured, comprising:
a plurality of segments of carbon fiber precursor material arranged in a spiral structure having a central longitudinal axis such that each segment of said plurality of segments is radially offset relative to said central longitudinal axis, wherein each segment of said plurality of segments has a partial annular shape when viewed in the longitudinal direction of said central longitudinal axis and has first and second ends, wherein segments of said plurality of segments are arranged end-to-end about said central longitudinal axis and form respective butt joints therebetween, and wherein said respective butt joints define respective single planes not coplanar with planes extending radially from and including said central longitudinal axis.

10. The brake rotor preform of claim 9, wherein said planes defined by said respective butt joints extend parallel to and absent inclusion of said central longitudinal axis.

11. The brake rotor preform of claim 9, wherein said spiral structure includes a plurality of flights formed respectively by consecutive segments of said plurality of segments arranged end-to-end, and wherein each flight of said plurality of flights comprises segments formed from carbon fiber precursor tow material oriented in the same direction.

12. The brake rotor preform of claim 9, wherein said spiral structure includes a plurality of flights formed respectively by consecutive segments of said plurality of segments arranged end-to-end, wherein one flight of said plurality of flights comprises segments formed from carbon fiber precursor tow material oriented in a first direction, wherein another flight of said plurality of flights comprises segments formed from carbon fiber precursor tow material oriented in a second direction, and wherein said first direction is different from said second direction.

13. The brake rotor preform of claim 9, wherein said spiral structure includes a plurality of flights formed respectively by consecutive segments of said plurality of segments arranged end-to-end, and wherein a flight of said plurality of flights comprises segments formed from carbon fiber precursor tow material oriented in a chordal direction.

14. The brake rotor preform of claim 9, wherein said spiral structure includes a plurality of flights formed respectively by consecutive segments of said plurality of segments arranged end-to-end, and wherein a flight of said plurality of flights comprises segments formed from carbon fiber precursor tow material oriented in a radial direction.

15. A vehicle brake pad for use with a vehicle brake rotor, comprising:
a member having an inner arcuate edge and an outer arcuate edge, having a first end extending between said inner and outer arcuate edges, and having a second end extending between said inner and outer arcuate edges;
wherein said first end and said second end are configured so as to never align during use with a plane extending radially from and including a central longitudinal axis of a vehicle brake rotor.

* * * * *